United States Patent [19]

Berube

[11] 4,271,955
[45] Jun. 9, 1981

[54] CASSETTE CORRELATOR

[75] Inventor: Richard G. Berube, Marlborough, Mass.

[73] Assignee: King Instrument Corporation, Westboro, Mass.

[21] Appl. No.: 88,339

[22] Filed: Oct. 26, 1979

[51] Int. Cl.³ .............................................. B65G 47/24
[52] U.S. Cl. ...................................... 198/400; 193/44; 221/171
[58] Field of Search ................... 198/400; 193/44, 47; 221/171, 172, 173

[56] References Cited

U.S. PATENT DOCUMENTS

| 4,061,286 | 12/1977 | King, Sr. et al. | 242/56 R |
| 4,078,698 | 3/1978 | Bosco | 221/171 |

Primary Examiner—Jeffrey V. Nase
Attorney, Agent, or Firm—Schiller & Pandiscio

[57] ABSTRACT

A cassette correlator for positioning between a tape cassette storage magazine and a cassette tape loading machine, the cassette correlator being designed to assure that empty tape cassettes emerging from the magazine will be oriented for proper reception by the tape loading machine.

16 Claims, 9 Drawing Figures

CASSETTE CORRELATOR

This invention relates to tape winding machines for loading cassettes with tape, and more particularly to devices for assuring that empty tape cassettes emerging from a cassette magazine will be oriented for proper reception by a tape winding machine.

BACKGROUND OF THE INVENTION

Tape winding machines, also known as "cassette loading machines" are well known in the art. Such devices are generally used to transfer magnetic recording tape from large supply reels prepared during tape manufacture to the smaller reels or cassettes utilized by commercially-available recording and playback equipment. See, for example, the following U.S. patents and the references cited therein: U.S. Pat. Nos. 3,637,153; 3,814,343; 3,940,080; 3,964,100, 3,997,123; 3,917,184 and 4,061,286.

Where fresh tape is to be loaded into cassettes, it is sometimes desirable to provide the tape winding machine with a magazine for storing a number of empty cassettes prior to their being filled with tape. The use of such magazines is advantageous in that it allows the tape winding machine to be automated so as to run for prolonged periods of time with minimal operator supervision, thereby cutting production costs and increasing machine productivity. In general these cassette magazines comprise a tall vertical chute having a rectangular cross-section which slidably constrains a plurality of cassettes stacked one on top of another. Fresh cassettes are typically loaded into the top of the chute by hand and withdrawn from the bottom of chute by successively removing the bottom-most cassette via automatic means. Such magazines and their attendant apparatus are shown in such U.S. Pat. Nos. as 3,997,123 and 4,061,286 and the references cited therein.

One problem which has been encountered with magazines such as those described above is that of cassette orientation. This problem arises from the fact that the empty tape cassettes which are to be filled with tape must all be received at the loading station of the tape winding machine with a specific orientation if the tape winding machine is to fill the cassettes with tape. In particular, the cassettes must be advanced to the winding machine oriented in such a way that the side of the cassette which exposes the cassette's leader tape i.e. the "open side" of the cassette, faces down and is accessible to the winding machine's leader extractor member. Unfortunately, the rectangular cross-section of the magazine chute is arranged only to align the outer perimeters of the cassettes with one another and not to orient the cassettes so that their open sides are correspondingly positioned. Thus, if empty cassettes are randomly fed into the top of the cassette magazine, cassettes will arrive at the discharge end of the magazine so that some of them will have their open sides facing one way while the rest will be facing the opposite way. This lack of uniformity in cassette orientation creates severe problems, since as was mentioned above the empty cassettes must all arrive at their loading position with their open sides facing down and accessible to the winding machine's leader extractor member in order for the winding machine to fill the cassettes with tape. Complicating the problem is the fact that most cassettes are of the type shown in U.S. Pat. Nos. 3,753,834 and 3,940,080, i.e. they have a stepped configuration and are thicker at their open sides than at their closed sides. The stepped configuration complicates storing the cassettes and feeding them one at a time into the winding machine, since if the cassettes are stacked one on the other and are all oriented identically the stack will be curved instead of straight.

The current solution to this cassette orientation problem has generally been to require the winding machine's operator to carefully load each empty cassette into the top end of a curved magazine with a specific, uniform orientation so that all of the cassettes will arrive at the bottom of the chute with their open sides facing the same direction. Such uniform cassette orientation at the bottom of the magazine chute then allows the cassettes to be advanced to their loading position with the proper orientation for filling by the tape winding machine. Unfortunately, this solution suffers from a number of disadvantages. First, requiring the machine operator to precisely orient each cassette as it is loaded into the cassette magazine leads to increased operator attendance at each winding machine and thereby drives labor costs upward and machine productivity downward. Second, by leaving the task of proper cassette orientation to a fallible human operator, the risk is increased that a cassette will be fed to the tape winding machine with an incorrect orientation. This is undesirable since the tape winding machine may be deactivated for a significant period of time when it encounters an improperly oriented cassette.

As a result, the primary object of the present invention is to provide a device for positioning cassettes between a tape cassette magazine and a tape winding machine so as to assure that all of the cassettes emerging from the magazine will be correctly oriented for proper reception by the tape winding machine even when the cassettes are loaded into the cassette magazine without a specific uniform orientation.

Another object of the present invention is to provide a cassette orienting device which is compatible with tape winding machines and cassette magazines of the type described above.

Still another object is to provide novel means for automatically causing a tape cassette to assume a predetermined orientation as the cassette moves along a selected path, e.g. from a cassette storage station to a cassette loading station.

SUMMARY OF THE PRESENT INVENTION

These and other objects of the present invention are addressed by providing in accordance with the preferred embodiment a cassette correlator designed to be located between a tape cassette magazine and a tape winding machine and adapted to automatically dispose empty tape cassettes so that each cassette will reach the tape winding machine correctly oriented for loading by the machine even when the cassettes are inserted into the cassette magazine without uniform orientation. The cassette correlator generally comprises a tapered chute which has a side opening at its top end for admitting cassettes into the chute one by one as they emerge from the magazine. The correlator is also provided with first, second and third bars and fourth bars set within the chute adjacent the side opening and aligned in a direction substantially parallel to the path of movement of the cassettes as the latter pass through the opening. The first and second bars are arranged on one side of the chute and vertically spaced from one another so as to define a channel therebetween which can accommodate the thin closed side of a cassette but not the thick open side of the same cassette. In addition, the ends of the first and second bars which are closest to the chute side opening are beveled. The third and fourth bars are disposed on the opposite side of the chute in positions corresponding to those of the first and second bars. The third and fourth bars are spaced far enough from the other bars so that if a cassette enters the chute oriented so that its thin side enters the channel between the first and second bars, the wide side of the cassette will not be supported by the third or fourth bars and the cassette will fall into the chute with its wide side oriented downward. At the same time, however, the third and fourth bars are spaced close enough to the other bars so that if a cassette enters the chute oriented so that its wide side faces the channel between the first and second bars, the cassette will be intercepted by the first and second bars' bevelled edges and shifted laterally so that its thin side will ride over and be supported by the top surface of the third bar and guided by the fourth bar. In this case the wide side of the cassette will be unsupported and the cassette will once again fall into the chute with its wide side oriented downward. In this way all the cassettes entering the top end of the chute will reach the bottom end of the chute oriented so that their open wide sides (i.e. those sides exposing the cassette's leader tape) will be oriented downward. This uniform cassette orientation may be achieved prior to winding machine reception of the cassettes even where the cassettes are not loaded into the magazine with uniform orientation and hence do not emerge from the cassette magazine uniformly oriented. Automatic means are provided for transporting cassettes from the bottom of the chute to the tape winding machine.

BRIEF DESCRIPTION OF THE DRAWINGS

Still other features and advantages of the present invention will be made more apparent by the following detailed description of the preferred embodiment, which is to be taken in conjunction with the drawings wherein.

DETAILED DESCRIPTION OF THE PREFERRED EMBODIMENT

Figure 1:
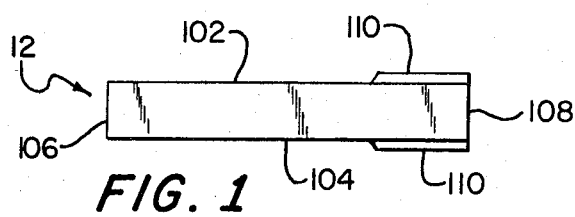
FIG. 1 is an end view in elevation of a form of cassette which the present invention is designed to handle.
Figure 2:
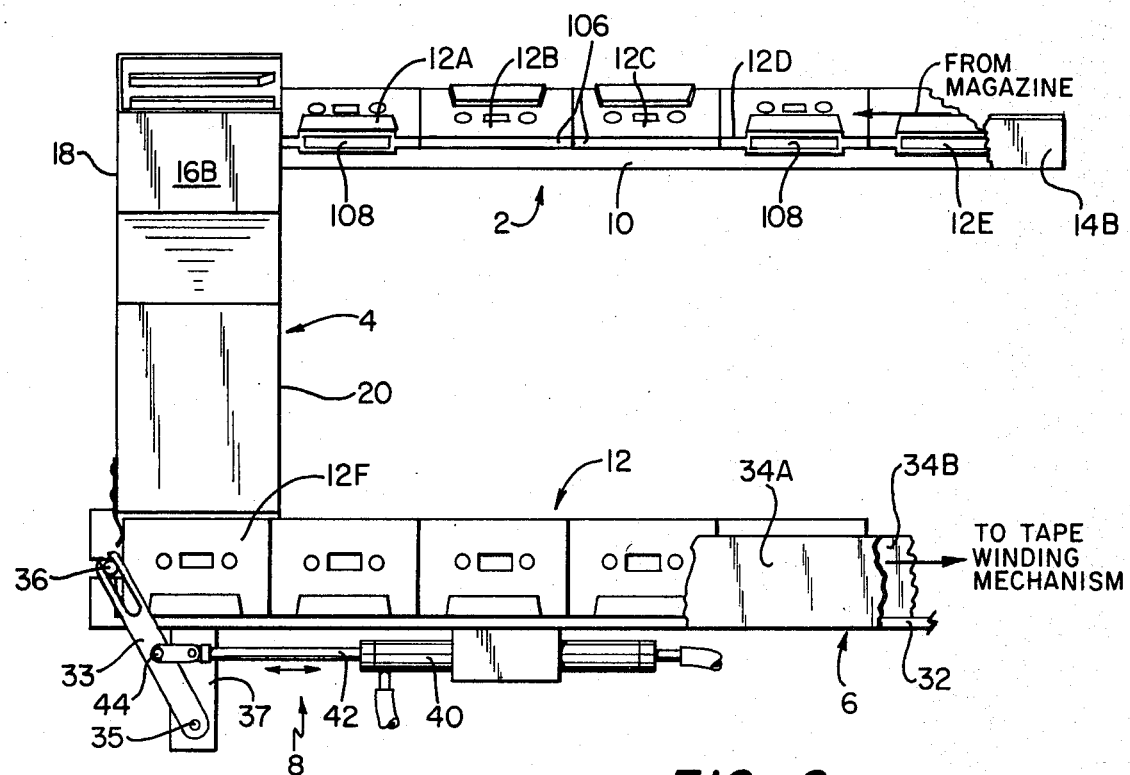
FIG. 2 is a view in rear elevation, with certain parts broken away, of a preferred embodiment of the present invention.

Looking first to FIGS. 1 and 2, the invention is designed to handle cassettes 100 of the dual-hub type shown in U.S. Pat. No. 3,753,834, having a casing made up of flat side walls 102 and 104, a closed rear side 106, a front side 108 which is open for access to the leader tape (not shown) which is attached to its two cassette hubs, and raised shoulders 110 on its two flat side walls. As a consequence of shoulders 110, the cassette is thicker at its open side than at its closed side.

Figure 3:
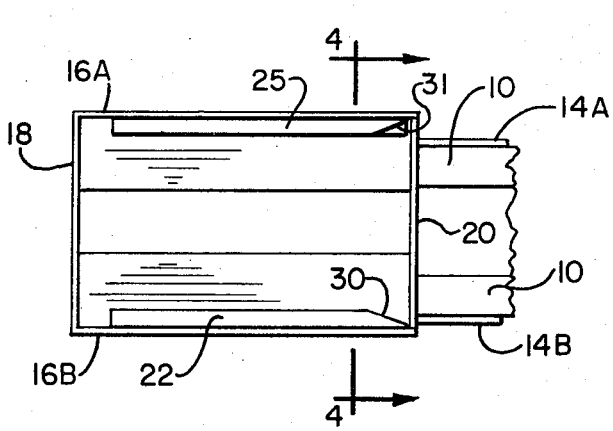
FIG. 3 is a partial top plan view showing the top end of the chute and a portion of the top rail member.
Figure 4:
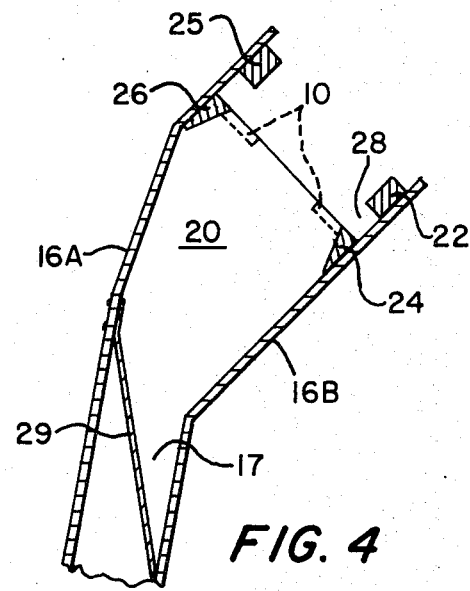
FIG. 4 is a sectional view taken along line 3—3 of FIG. 3.

Looking now to FIGS. 2–4, it will be seen that the preferred embodiment of the cassette correlator is generally comprised of a top rail 2, a transfer chute 4 provided with cassette orienting means, a bottom rail 6 and cassette advancing means 8.

Top rail 2 is horizontal and serves to support empty tape cassettes as they travel in series from a magazine or other storage means or feeding device (not shown) to the top end of chute 4. Thus the storage means may comprise a magazine arranged to hold a vertical stack of cassettes and means for removing cassettes one at a time from the magazine, e.g. a magazine of the type disclosed in U.S. Pat. Nos. 3,940,080 and 4,061,286. Of course, other forms of storage devices may be used with this invention so long as they are adapted to discharge the empty cassettes one at a time in a substantially aligned manner wherein the sides 106 and 108 of the cassette are substantially parallel to the path of movement of the cassette as a whole. Instead of a magazine, the source of empty cassettes may be a feeding device, e.g. a conveyor which may be of any suitable design, e.g. an endless belt type of conveyor. Rail 2 is preferably comprised of a pair of flat bars 10 which are disposed parallel to one another so that their top surfaces lie in the same plane, in order that a plurality of tape cassettes 12 may be slidably moved along the top surfaces of the rods. One end of rail 2 is positioned near the discharge end of the magazine or other storage or feeding device (not shown) so that tape cassettes emerging from the magazine or other storage or feeding device will automatically slide onto rail 2, and the other end of rail 2 is positioned so as to discharge cassettes directly into the top end of chute 4. The cassettes are propelled along rail 2 by the feeding device or by whatever mechanism is used to feed cassettes from the storage device, since each cassette on rail 2 will be pushed toward chute 4 by the cassette immediately behind it.

A pair of outboard retaining members 14A and 14B are attached to the rods 10 as shown to prevent the cassettes 12 from falling off rail 2 before they reach the top of chute 4. The plane defined by the top surfaces of bars 10 is inclined relative to the ground, whereby the cassettes supported thereon tend to fall toward and are supported by retaining member 14B. Retaining members 14A and B also serve as guides to keep the cassettes 12 relatively aligned with one another as they move along rail 2. It is to be appreciated, however, that while the cassettes 12 will be substantially aligned with one another as they move along the rail, they will not necessarily all be oriented in the same way. In particular, as shown in FIG. 2, some cassettes 12 may be oriented on rail 2 with their open sides facing retaining member 14B (e.g. cassettes 12A, 12D and 12E) and some cassettes 12 may be oriented with their open sides facing away from that retaining member (e.g. cassettes 12B and 12C). Such a cassette arrangement is likely to occur on top rail 2 when cassettes are randomly loaded into a cassette magazine and delivered from the magazine onto rail 2. Rail 2 may be mounted directly to the tape winding machine itself (not shown) or it may be mounted to one or more members which are themselves supported by the tape winding machine, e.g. the cassette magazine and the vertical chute 4 may be attached directly to the winding machine. The essential thing is that rail 2 is disposed so that it will continually feed cassettes one at a time in single file to chute 4 in substantially the same orientation as they are fed onto the rail.

Transfer chute 4 is connected to rail 2 directly or by suitable connecting means (not shown) and is adapted to receive the variously oriented cassettes moving down rail 2 at its top end and give them all uniform orientation by the time they reach the chute's bottom end. For this purpose chute 4 is comprised of two opposite side walls 16A and 16B and two opposite end walls 18 and 20. Both the top and bottom ends of chute 4 are open. Side walls 16A and 16B are widely spaced from one another at the chute's middle, and are closely spaced from one another at the chute's bottom end. At the chute's top end walls 16 are spaced further apart than are the outboard retaining members 14A and 14B of top rail 2 (see FIG. 2) and at the chute's bottom end the walls 16 are spaced substantially less than members 14A and 14B, but enough to accommodate a cassette if it is oriented so that its sides 106 and 108 are displaced vertically one from the other. Chute 4 is formed so that its top end is inclined relative to the ground while its bottom end is vertical or nearly so. Top rail 2 is positioned to deliver tape cassettes 12 into the top end of chute 4 via a side opening formed by side walls 16A and 16B and end wall 20. For this purpose, the upper edge of end wall 20 terminates flush with the upper surfaces of flat rods 10, while side walls 16A and 16B and end wall 18 are substantially higher. Wall 18 serves as a cassette stop. Preferably chute 4 is mounted to one or more members which are mounted to the tape winding machine, but it may be mounted directly to the tape winding machine.

Disposed in the top end of chute 4 are four bars 22, 24, 25 and 26 which make up the cassette orienting means. Bars 22 and 24 are disposed parallel to one another on side wall 16B and are arranged vertically so that their flat bottom and top surfaces respectively define a horizontal groove 28 therebetween. Groove 28 is sized so that the thin side 106 of a tape cassette will fit between the bars 22 and 24 but the thick side 108 of the cassette will not. In addition, those ends of bars 22, 24 and 25 which are nearest to top rail 2 are bevelled as shown at 30 and 31. Bars 25 and 26 are disposed on the opposite side wall 16A of chute 4 parallel to bars 22 and 24 and are disposed so that their flat bottom and top surfaces respectively are coplanar with the flat bottom and top surfaces respectively of bars 22 and 24. At the same time, the flat top surfaces of bars 24 and 26 are coplanar with the inclined top surfaces of bars 10 of rail member 2 and extend at a right angle to the flat upper ends of side walls 16A and 16B of chute 4. Furthermore, it is to be appreciated that the distance between bars 24 and 26 is less than the width of one cassette, i.e. the distance from side 106 to side 108. It is to be noted also (see FIG. 3) that the inner surface of retaining member 14B lies in a plane which passes through and is parallel to bars 22 and 24, while the inner surface of retaining member 14A lies in a plane which is parallel to but spaced from the inner surface of bar 26. As a consequence, cassettes moving from rail 2 into chute 4 will tend to be intercepted by bar 24 but not by bar 26.

Figure 5:
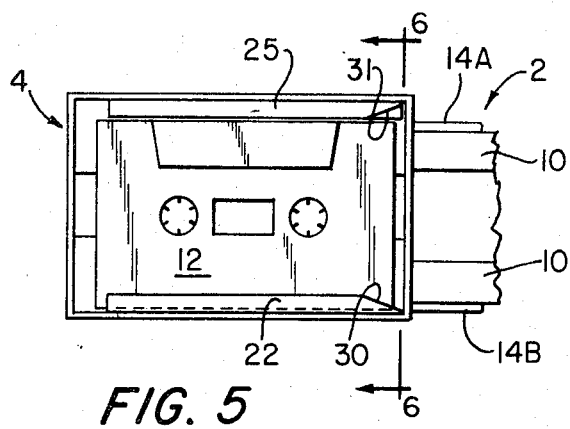
FIG. 5 is a view like that of FIG. 2 showing a cassette entering the top end of the chute with a first orientation.
Figure 6:
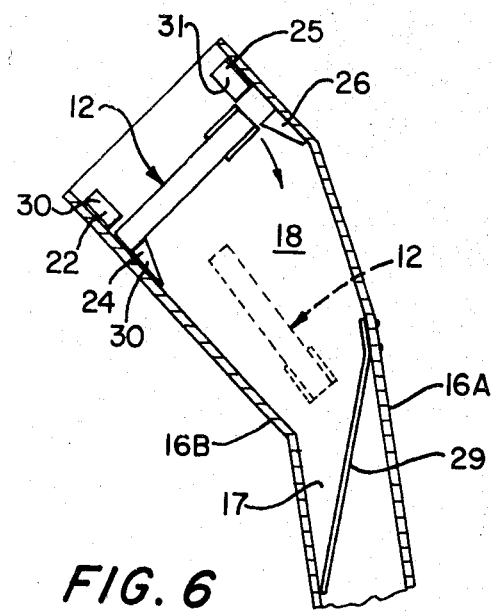
FIG. 6 is a sectional view taken along line 6—6 of FIG. 5.
Figure 7:
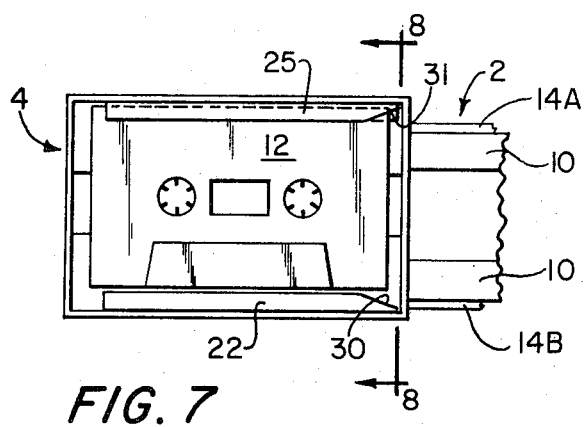
FIG. 7 is a view like that of FIGS. 3 and 5 showing a cassette entering the top end of the chute with a second orientation.
Figure 8:
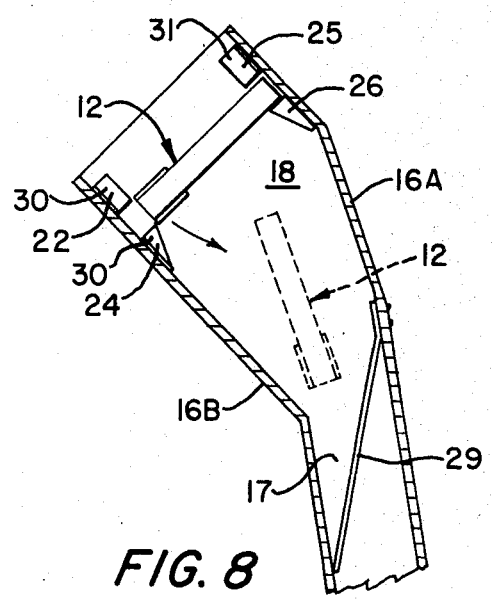
FIG. 8 is a sectional view taken along line 8—8 of FIG. 7.

As a result of this chute construction when a cassette 12 enters chute 4 from rail 2 with its open side 108 oriented towards bar 26 (FIGS. 5 and 6), the narrow side 106 of cassette 12 will be received in groove 28 and that end of the cassette will be supported by bar 24. At the same time, however, the open side of the cassette will be short of bar 26 and thus the open side of the cassette will be unsupported within chute 4. As a result, the cassette will fall into chute 4 with its open side oriented downward, as shown in dotted lines (FIG. 6). However, when a cassette 12 enters the top of chute 4 with its open side oriented toward the bars 22 and 24 (FIGS. 7 and 8), the open side of the cassette will not fit in groove 28 and instead the cassette 12 will strike bevelled edges 30 and be shifted laterally within chute 4 so that the narrow closed side 106 of the cassette is supported by the top surface of bar 26 and the open side of the cassette will be unsupported within chute 4. The cassette will then once again fall down into chute 4 with its open side oriented towards the bottom of the chute, as shown in dotted lines in FIG. 8. Thus, it will be seen that each cassette 12 will always arrive at the bottom end of chute 4 with open side oriented downward, regardless of whether that side of the cassette was oriented toward side wall 16A or 16B of the chute 4. In this way uniform cassette orientation may be achieved automatically as the cassettes are transported from the cassette magazine to the cassette winding machine.

Bar 25 is not absolutely essential and may be omitted. However, its use is preferred since its bottom surface serves to provide guidance and stability to the cassettes when their narrow sides ride up on bar 26. The space between bars 25 and 26 will accommodate the narrow but not the wide sides of the cassettes.

A damper device is included in chute 4 to slow up the cassettes as they drop toward rail 6. The damper device consists of a resilient member 29 having one end anchored to side wall 16A and its other end free and terminating adjacent end wall 16B. Member 29 retards a dropping cassette but bends under its weight far enough to allow it to be discharged from the chute.

Figure 9:
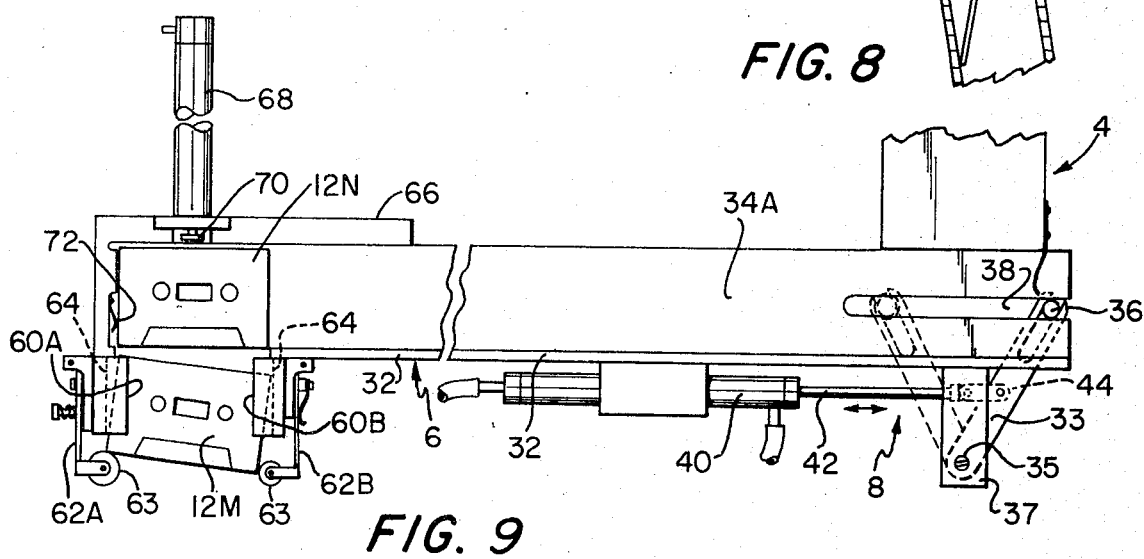
FIG. 9 is a partial view in front elevation showing how the apparatus is associated with the loading station of a tape winding machine.

Referring now to FIGS. 2 and 9, rail 6 is in the form of a channel, being comprised of a flat bottom bar 32 and a pair of opposite side retaining members 34A and 34B which rise vertically from bar 32. Rail 6 and members 34A and 34B are supported by suitable means, e.g. brackets (not shown) attached to the winding machine and are fixed with respect to chute 4. Retaining members 34A and 34B are preferably formed of a clear plastic such as Plexiglass, though other materials may be used. Bar 32 and members 34 cooperate to define a channel which extends below the narrow substantially vertically extending bottom end of chute 4 in position to receive cassettes emerging from chute 4. The channel defined by bar 32 and surfaces 34 is sized so as to keep cassettes 12 standing on edge with their relatively wide open sides resting on the top surface of bar 32, while still allowing the cassettes to be slidably moved along the channel. As indicated, in FIGS. 2 and 9, the channel leads from the bottom of chute 4 to a tape winding machine, e.g. a machine of the type shown in U.S. Pat. No. 4,061,286 modified so that in place of its curved cassette storage magazine it has guide means arranged to receive cassettes from the aforementioned channel and locate them in cassette loading position.

Cassette advancing means 8 are provided below chute 4 to move cassettes 12 along the bottom rail 6 from the bottom of chute 4 to the tape winding machine. The cassette advancing means 8 comprises an arm 33 adapted to pivot about a pivot pin 35 carried by a bracket 37 affixed to rail 6. Arm 33 is slotted at its free end (as shown in FIGS. 2 and 9) so as to slidably receive a horizontally extending pin 36. Pin 36 extends across the bottom rail and is slidably received by horizontal slots 38 formed in side retaining members 34 (FIG. 9). In this way by moving arm 33 about its pivot pin 35 the pin 36 can be moved horizontally within the channel defined by bar 32 and side retaining members 34. A pneumatic actuator 40 attached to the underside of rail 6 has its operating rod 42 pivotally secured to a link 44, which in turn is pivotally connected to arm 33, whereby reciprocating movement of rod 42 will cause corresponding movement of arm 33 about its pivot 35. The actuator is arranged so that when its operating rod 42 is fully extended as shown in FIG. 2, pin 36 will be to one side of end wall 18 of chute 4 in position not to interfere with movement of a cassette dropping down from chute 4 onto rail 6. The stroke of rod 42 is long enough to move pin 36 into approximate alignment with but not past the other end wall 20 of chute 4, i.e. through a distance approximately equal to the length of the cassettes (which is the horizontal dimension of the cassettes as seen in FIG. 1). It will be thereby appreciated that by reciprocating pivot arm 33 about its pivot 35, successive cassettes 12 from chute 4 may be moved along bottom rail 6 in single file. In practice actuator 40 is operated at the same rate as cassettes are delivered via rail 2 to chute 4, so that each cassette discharged by chute 4 falls directly on rail 6. In the event that a cassette drops to the bottom of chute 4 while the previous cassette is still directly below the chute on rail 6 in the position of the cassette 12F in FIG. 2, the latter cassette will support the one in chute 4 until the next operation of actuator 40, whereupon the latter cassette will be moved along rail 6 and the one in chute 4 will drop down onto rail 6 after arm 33 has returned to the starting position shown in FIG. 2. In this connection it is to be noted that the distance between end walls 18 and 20 is only slightly greater than the length of the cassettes to be handled and the spacing between side walls 16A and 16B at the lower end of the chute is only slightly greater than the maximum thickness of a cassette, so that only one cassette at a time can be accommodated by the narrow bottom section 17 of the chute. Additionally, the spacing between the side members 34A and 34B is substantially the same as the spacing between sides walls 16A and 16B at bottom section 17 so as to assure ready movement of cassettes from below chute 4 along rail 6.

FIG. 9 illustrates how the invention may be applied to a winding machine of the type shown in U.S. Pat. No. 4,061,286. In such a machine the cassette loading station comprises a pair of spaced parallel cassette guide members 60A and 60B mounted on the front panel of the machine and provided with resilient cassette retaining members 62A and 62B which have wheels 63 which bear against and support a cassette 12M in loading position. Guide members 60A and 60B and retaining members 62A and 62B correspond to guide plates 36 and clips 155 of the machine shown in U.S. Pat. No. 4,061,286. Guide members 60A and 60B have grooves 64 for slidably receiving and holding opposite side edge portions of cassette 12M. Guide member 60B terminates at bar 32 of rail 6 while guide member 60A extends above bar 32 and is integral with a top guide member 66 which extends along the top edge of side members 34. Mounted on guide member 66 is a penumatic actuator 68 having a pusher 70 on the end of its piston rod for engaging a cassette 12N located against guide member 60A above cassette 12M. Actuator 68 corresponds to actuator 62 shown in FIGS. 2 and 4 of U.S. Pat. No. 4,061,286. Actuator 68 is operated each time a winding operation is completed, causing pusher 70 to drive cassette 12N down far enough for it to eject cassette 12M and be held in loading position by wheels 63. A leaf spring 72 on guide member 60A coacts with the cassette immediately behind cassette 12N to hold cassette 12N so that it will not fall down against cassette 12M until it is thrust down by pusher 70.

In practice an empty cassette must be delivered to the loading station of the winding machine each time a freshly loaded cassette is discharged from the winding machine. Hence actuator 40 is operated intermittently on command as soon as a loaded cassette is discharged. Additionally in a fully automated cassette winding machine, the mechanism for removing empty cassettes from the magazine and delivering them onto rail 2 is operated in synchronism with actuator 40, so that as one cassette is pushed from rail 6 to the loading station of the winding machine, another cassette is transferred from the magazine onto rail 2 and simultaneously another cassette is forced off of rail 2 into chute 4 directed open side down so as to fall onto rail 6 in position to be engaged by pin 36 in the next operating stroke of actuator 40. By way of further example, the mechanism for removing empty cassettes from the magazine and delivery them onto rail 2 could be an ejector type device operated by a pneumatic actuator similar to actuator 40, and synchronized operation of both actuators could be controlled by one or two solenoid-type flow control valves actuated by a control signal from the cassette winding machine, with the control signal occurring after pusher 70 has completed a cassette ejecting operation.

There are several advantages to using the present invention. First, it will be appreciated that since the cassette correlator will serve to assure that all of the cassettes reaching the tape loading station of the tape winding machine will arrive there correctly oriented for proper operation thereon by the winding machine, loading of the cassette magazine is speeded up since the machine operator no longer needs to precisely orient each cassette as it is placed into the cassette magazine. Second, since the cassette correlator removes the possibility of a cassette reaching the loading station of the tape winding machine with incorrect leader tape orientation, less time is lost due to improper cassette feeding and hence productivity is increased. And third, it will be appreciated that the cassette correlator is compatible with existing cassette loading machines.

It will also be appreciated by those skilled in the art that various modifications may be made to the preferred embodiment without changing the scope of the present invention. Thus one might form the top rail 2 from a single flat bar which has a wide upper surface. Additionally, one might arrange the top rail 2 so that its cassette-carrying surface does not lie exactly horizontal. In such a case the chute 4 may be appropriately modified to receive cassettes from the top rail 2 and still deposit them in a substantially vertical plane on bottom rail 6. A further modification would be to use a reciprocating feeder similar to arm 33, pin 36 and actuator 40 to move cassettes on rail 2. Still another possible modification is to separate the cassette-correlating upper sections of the chute from the remainder of the chute so as to have two discrete assemblies . Furthermore the chute 4 could be arranged so that its bottom end discharges the cassettes at a relatively flat angle onto a rail or other conveyor means arranged to allow the cassettes to lie flat in the manner of the cassettes on rail 2. Also bars 22 and 24 could be replaced by a single bar having a flat groove corresponding to channel 28. These and other changes of their type are foreseen as readily obvious to one skilled in the art.

What is claimed is:

1. A cassette feed correlator for cassettes of the type having a first relatively thick side section and a second opposite relatively thin side section with said sections terminating in parallel side edges, said correlator comprising:

a tapered chute vertically disposed and having a first opening at its top end and a second opening at its bottom end, said first opening being sized and positioned so as to admit into the interior of said chute a tape cassette fed horizontally in such a way that its said parallel side edges are substantially parallel to the direction of motion of the cassette as a whole, and said second opening being sized and positioned so as to allow a cassette to pass out of the bottom end of the chute with one of said two parallel side edges trailing the other side edge;

first, second and third bars disposed within said chute adjacent said first opening and arranged so as to be substantially parallel to the path of movement of a cassette as it enters the chute via said first opening; said first and second bars being arranged on one side of said chute and being vertically spaced from one another so as to define a horizontal channel therebetween which can accommodate the thin side section but not the thick side section of a cassette, and said third bar being disposed on the opposite side of said chute at a vertical position correlating to the vertical position of the lower of said first and second bars, said third bar being disposed relative to said first and second bars so that a cassette entering said chute via said first opening will initially contact the lower of said first and second bars and not said third bar, whereby (1) when a cassette enters said chute via said first openin so that its thin side section enters said horizonal channel, the thick side section of the cassette will not be supported by said third bar and the cassette will fall down the chute and exit said second opening with said thick side section oriented downward, and (2) when a cassette enters said chute via said first opening so that its thick side section faces said first and second bars, the thick side section of the cassette will not enter said horizontal channel and the cassette will instead be shifted laterally by contact of the cassette with said first and second bars so that the cassette's thin side section will ride along the top surface of said third bar and the thick side section of the cassette will be unsupported and the cassette will fall into the chute and exit said second opening with said thick side section oriented downward.

2. A cassette correlator according to claim 1 further including transport means for conveying cassettes to said first opening from a remote supply of cassettes.

3. A cassette correlator according to claim 2 wherein said transport means is a rail arranged to slidably support a series of cassettes in end to end fashion.

4. A cassette correlator according to claim 3 wherein said transport means is provided with means for slidably constraining a plurality of cassettes in series as the cassettes move along said rail to said first opening.

5. A cassette correlator according to claim 3 wherein said rail runs from a cassette storage magazine to said first opening.

6. A cassette correlator according to claim 1 wherein a track is disposed below said second opening to receive cassettes as they emerge from said second opening in said chute, said track being adapted to slidably constrain the cassettes in the orientation in which they emerge from said second opening.

7. A cassette correlator according to claim 6 further including cassette advancing means for advancing cassettes along said track away from their position immediately below said second opening.

8. A cassette correlator according to claim 7 wherein said cassette advancing means comprises a pneumatic actuator.

9. A cassette correlator according to claim 7 wherein said cassette advancing means comprises an arm pivoted at one end and slotted at its free end, and a pin slidably received in said slot and simultaneously received in another slot formed in said track, so that as said arm is moved about its pivot said pin may be moved relative to said track so as to engage a cassette discharged from said chute via said second opening and advance said cassette along said track away from said bottom end of said chute.

10. A cassette correlator according to claim 9 further including a pneumatic actuator adapted to move said arm back and forth about its pivot.

11. Apparatus according to claim 1 in combination with a cassette loading machine, said machine having a cassette loading station characterized by means for retaining a single cassette at said loading station while it is being loaded and for discharging said single cassette from said loading station after it has been loaded, and further including means for delivering cassettes from said second opening in said chute to said cassette loading machine.

12. Apparatus for use in transporting and uniformly orienting cassettes of the type having a first relatively thick side section and a second opposite relatively thin side section, said apparatus comprising:

means for transporting cassettes so that said first and second side sections are disposed in a selected plane as they are being transported; and cassette orienting means for (a) receiving cassettes from said transporting means at a first predetermined location, (b) orienting said cassettes so that they are oriented identically, and (c) directing said identically oriented cassettes to a second predetermined location, said cassette orienting means comprising a chute for receiving cassettes at said first predetermined location and discharging the same cassettes at said second predetermined location, first means deployed about said upper end of said chute adjacent said first location and defining a channel disposed in the path of cassettes conveyed by said transporting means, said channel being sized to accommodate the second relatively thin side section of a cassette but not the first relatively thick side section of a cassette, and second means deployed about said upper end of said chute adjacent said first location and spaced from said channel and adapted to act as a support and pivot for cassettes disposed so that their second relatively thick side sections are adjacent to but spaced from said channel, said second means being located so as to be spaced from the first relatively thick side section of a cassette having its second relatively thin side section located in said channel, whereby a cassette having its relatively thin section supported by said second means can pivot by gravity about said second means and a cassette having its second relatively thin section disposed in said channel can pivot by gravity about said first means, in order that said cassettes will emerge from said chute so that said first relatively thick sections of said cassettes lead said second relatively thin sections of said cassettes as said cassettes advance to said second predetermined location.

13. Apparatus according to claim 12 wherein said cassette orienting means comprises third means coacting with said second means so as to form a second channel adapted to accommodate the relatively thin side section but not the relatively thick side section of a cassette.

14. Apparatus according to claim 12 wherein said first means comprises two parallel spaced members.

15. Apparatus according to claim 12 wherein said first and second means are surfaces on the interior of said chute.

16. Apparatus according to claim 12 in combination with a cassette loading machine, said machine having a cassette loading station characterized by means for retaining a single cassette at said loading station while it is being loaded and for discharging said single cassette from said loading station after it has been loaded, and further including means for transporting cassettes from said second location to said loading station.

* * * * *